United States Patent
Ibi (10) Patent No.: US 8,508,600 B2
(45) Date of Patent: Aug. 13, 2013

(54) IMAGING APPARATUS FOR STABILIZING AN IMAGE

(75) Inventor: Toshio Ibi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/466,262

(22) Filed: May 14, 2009

(65) Prior Publication Data

US 2009/0309985 A1 Dec. 17, 2009

(30) Foreign Application Priority Data

Jun. 11, 2008 (JP) ................................. 2008-153401

(51) Int. Cl.
*H04N 5/228* (2006.01)

(52) U.S. Cl.
USPC .............. 348/208.11; 348/208.99; 348/208.4; 348/208.7; 348/208.12; 396/231

(58) Field of Classification Search
USPC ................... 348/208.5, 208.4, 208.7, 208.11, 348/208.12, 208.99; 396/231
See application file for complete search history.

(56) References Cited

U.S. PATENT DOCUMENTS

| | | | | |
|---|---|---|---|---|
| 5,513,387 | A * | 4/1996 | Saito et al. .................. | 455/243.1 |
| 5,966,549 | A * | 10/1999 | Hara et al. ........................ | 396/54 |
| 6,233,009 | B1 * | 5/2001 | Morofuji et al. ............ | 348/208.8 |
| 6,351,504 | B1 * | 2/2002 | Igarashi et al. ................ | 375/349 |
| 7,460,772 | B2 * | 12/2008 | Ishikawa et al. ................ | 396/52 |
| 7,864,477 | B1 * | 1/2011 | Chua ............................... | 360/67 |
| 2001/0020867 | A1 * | 9/2001 | Miura ............................ | 330/129 |
| 2005/0083419 | A1 * | 4/2005 | Honda et al. .................. | 348/244 |
| 2005/0159148 | A1 * | 7/2005 | Habuka et al. ................ | 455/423 |
| 2008/0069552 | A1 * | 3/2008 | Washisu .......................... | 396/55 |
| 2008/0094498 | A1 * | 4/2008 | Mori .............................. | 348/352 |
| 2008/0260374 | A1 * | 10/2008 | Kawashima .................. | 396/225 |
| 2009/0128638 | A1 * | 5/2009 | Okada ........................ | 348/208.2 |

FOREIGN PATENT DOCUMENTS

| | | |
|---|---|---|
| JP | 06-082889 A | 3/1994 |
| JP | 10-150595 A | 6/1998 |
| JP | 2004-080457 A | 3/2004 |

(Continued)

OTHER PUBLICATIONS

Japanese Office Action for JP 2008-153401 dated Jul. 3, 2012.

*Primary Examiner* — Antoinette Spinks
(74) *Attorney, Agent, or Firm* — Carter, DeLuca, Farrell & Schmidt LLP (57) ABSTRACT

An imaging apparatus with an image sensor and a correction optical system movable in a direction perpendicular to an optical axis includes a vibration detection unit configured to detect a vibration applied to the imaging apparatus, a vibration correction unit configured to drive the correction optical system to correct an image vibration according to an output from the vibration detection unit, a motion vector detection unit configured to detect a motion vector based on an image signal output from the image sensor, an amplifier unit configured to amplify the output from the vibration detection unit, a gain setting unit configured to set a gain of the amplifier unit based on the motion vector; and a gain control unit configured to allow or inhibit the setting of the gain of the amplifier unit set based on the motion vector, according to a change of an imaging condition of the imaging apparatus, wherein the vibration correction unit performs a vibration correction based on the output from the vibration detection unit and the gain of the amplifier unit when the setting of the gain of the amplifier unit is allowed by the gain control unit.

10 Claims, 8 Drawing Sheets

(56) References Cited

FOREIGN PATENT DOCUMENTS

| | | |
|---|---|---|
| JP | 2004-226692 A | 8/2004 |
| JP | 2005-049591 A | 2/2005 |
| JP | 2005-203861 A | 7/2005 |
| JP | 2005203861 A * | 7/2005 |
| JP | 2005-303933 A | 10/2005 |
| WO | 2007097287 A1 | 8/2007 |

* cited by examiner

FIG. 8 imaging apparatus for stabilizing
an image

BACKGROUND OF THE INVENTION

1. Field of the Invention

The present invention relates to an imaging apparatus having an image stabilizing function.

2. Description of the Related Art

In an imaging apparatus such as a digital camera and a video camera, an object image often vibrates caused by a camera shake. As a result, the image may become awkward to view. Recently, as high magnification lenses are mounted on cameras, the image vibration has come to highly stand out especially at a telephoto side.

A method for correcting a vibration of the image caused by the camera shake or the like applied from outside of the camera includes an optical image stabilizing system and an image sensor type system, and many imaging apparatuses including such functions have already been put into the market.

A method for detecting a vibration such as the camera shake, for example, includes a sensor method for detecting a vibration of the imaging apparatus due to the hand shake by using a vibration sensor, and a motion vector method for detecting a vibration based on a captured image. In the sensor method, usually an angular velocity sensor is used.

The angular velocity sensor vibrates a vibration material at a constant frequency, and converts a Coriolis force generated by a rotational motion component into a voltage to obtain angular velocity information. An image vibration correction is performed by performing integration on the obtained angular velocity information, calculating a vibration correction amount or a driving target position from a vibration output signal, and driving a correction unit by using the calculation result.

On the other hand, in the motion vector method, an image vibration is detected as a motion vector, by detecting an image of an object focused on an image sensor via an imaging lens, storing the image in a memory as an image signal, and comparing the image signal with the next detected image signal. The vibration correction amount is calculated from the calculated motion vector, and the image is corrected using the optical image stabilizing system or the image sensor type stabilizing system.

When using the image stabilizing function, a feedback control for feeding back a correction lens position signal to the vibration correction amount is performed in both methods.

Many methods and apparatuses for correcting the image vibration according to the vibration correction amount calculated using the vibration output signal obtained from the vibration sensor or the captured image signal are proposed. As the imaging apparatus is downsized, an optical system such as an imaging lens is also downsized, and an angle of view that can be imaged is also increasingly restricted.

Therefore, chances of attaching a conversion lens for changing a magnification of the imaging lens to take a wider angle image or a farther image increase. However, when attaching a high magnification zoom lens or conversion lens, for example, a correction amount obtained from a vibration applied to a camera may not correspond to a displacement to be corrected on the image.

In Japanese Patent Application Laid-Open No. 2005-203861, the following technique is discussed. That is, a gain adjustment value coefficient is calculated based on a vibration output signal generated based on a camera shake signal detected by the vibration sensor and a vibration output signal generated based on a motion vector detected by a motion vector detection unit. Then, by gain-controlling the vibration output signal from the vibration sensor by using a vibration correction gain set based on the gain adjustment value coefficient, the effect of an image vibration correction function is improved.

The vibration correction gain is adjusted for adjusting an output variation due to variation of the individual vibration sensor, an environmental change, and a deterioration of the vibration sensor with age, so that the vibration output signal of the vibration sensor becomes constant for a predetermined camera shake.

However, in the conventional example, when calculating the gain adjustment value coefficient based on a motion vector including a camera vibration when imaging a moving object, an appropriate vibration correction gain cannot be obtained and a sufficient image vibration correction effect cannot be obtained in a captured image.

When calculating the gain adjustment value coefficient in a panning operation of the imaging apparatus, an appropriate vibration correction gain cannot be obtained during and just after the panning operation. Therefore, a sufficient image vibration correction effect cannot be obtained for an image captured during and just after the panning operation.

In the conventional example, since a calculation for setting the vibration correction gain is kept performing other than when the vibration correction gain changes after setting the vibration correction gain, an unnecessary calculation load is applied to a calculation processing unit.

SUMMARY OF THE INVENTION

The present invention is directed to an imaging apparatus capable of setting an appropriate vibration correction gain and reducing a calculation load for setting the vibration correction gain.

According to an aspect of the present invention, an imaging apparatus with an image sensor and a correction optical system movable in a direction perpendicular to an optical axis includes a vibration detection unit configured to detect a vibration applied to the imaging apparatus, a vibration correction unit configured to drive the correction optical system to correct an image vibration according to an output from the vibration detection unit, a motion vector detection unit configured to detect a motion vector based on an image signal output from the image sensor, an amplifier unit configured to amplify the output from the vibration detection unit, a gain setting unit configured to set a gain of the amplifier unit based on the motion vector; and a gain control unit configured to allow or inhibit the setting of the gain of the amplifier unit set based on the motion vector, according to a change of an imaging condition of the imaging apparatus, wherein the vibration correction unit performs a vibration correction based on the output from the vibration detection unit and the gain of the amplifier unit when the setting of the gain of the amplifier unit is allowed by the gain control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
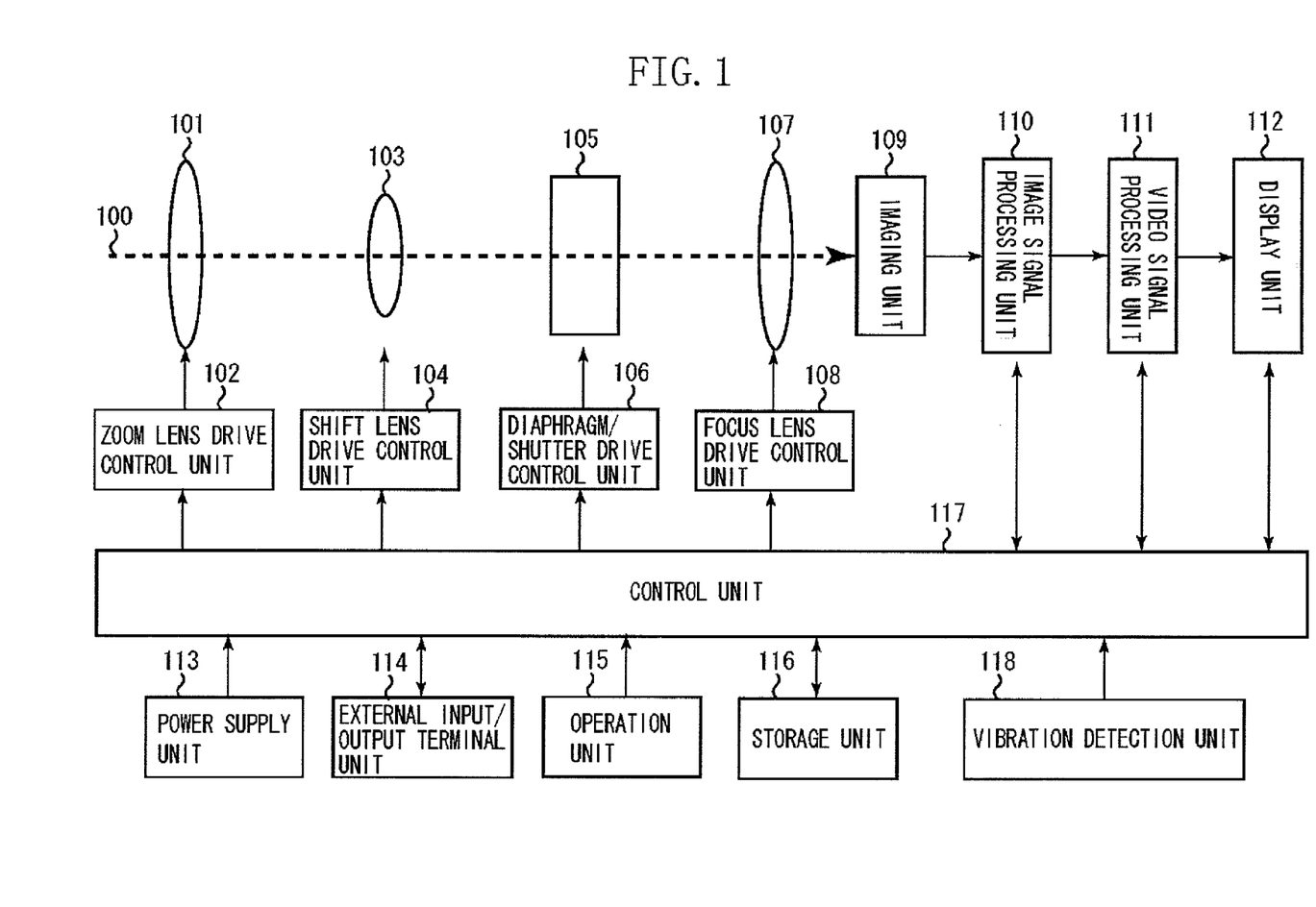
FIG. 1 is a block diagram schematically illustrating a system configuration of an imaging apparatus according to each exemplary embodiment of the present invention.

FIG. 1 is a block diagram schematically illustrating a system configuration of an imaging apparatus according to a first exemplary embodiment of the present invention. In FIG. 1, a zoom lens drive control unit 102 controls to drive a zoom lens unit 101 including a zoom lens for performing a variable magnification.

A shift lens unit 103 (an image vibration correction lens) can move in a direction perpendicular to an optical axis 100 and thereby enables changing an angle of view (image vibration correction). A shift lens drive control unit 104 controls to drive the shift lens 103 in the direction perpendicular to the optical axis 100.

A diaphragm/shutter drive control unit 106 controls the driving of a diaphragm/shutter unit 105. A focus lens unit 107 includes a focus lens. A focus lens drive control unit 108 controls the driving of the focus lens unit 107.

An imaging unit 109 converts a light image passing through each lens group into an electrical signal. An image signal processing unit 110 converts the electrical signal from the imaging unit 109 into a video signal. A video signal processing unit 111 processes the video signal from the image signal processing unit 110 according to the intended use. A display unit 112 displays a signal from the video signal processing unit 111 as needed.

A power supply unit 113 supplies power used in an overall system according to intended use. An external input/output terminal unit 114 performs a communication with an outside and an input/output of the video signal. An operation unit 115 operates the system. A storage unit 116 stores various data such as video information. A control unit 117 controls the overall system. A vibration detection unit 118 detects a vibration such as a camera shake when the imaging apparatus is in a normal position.

Next, the overall system of the imaging apparatus in the configuration will be described.

The operation unit 115 includes a shutter release button configured to turn on a first switch (SW1) and a second switch (SW2) in this order corresponding to a pressed-down length. Specifically, the shutter release button has a structure in which the first switch is turned on when the shutter release button is half pressed down, and the second switch is turned on when the shutter release button is completely pressed down.

When the first switch is turned on, focus adjustment is performed by the focus lens unit 107 and an appropriate light exposure amount is set by the diaphragm/shutter unit 105. Furthermore, when the second switch is turned on, an object image is exposed to the imaging unit 109, and image information obtained by the imaging unit 109 is stored in the storage unit 116.

When a vibration correction is instructed by a vibration correction switch included in the operation unit 115, the control unit 117 instructs the shift lens drive control unit 104 to correct an image vibration. In this way, the shift lens 103 is moved in a flat plane orthogonal to a light axis until an instruction for stopping the image vibration correction is issued.

A still image mode and a moving picture mode can be selected, and each actuator operation condition in each mode can be changed in the imaging apparatus.

When a zooming operation is instructed by a zoom switch included in the operation unit 115, the control unit 117 moves the zoom lens unit 101 to an instructed zoom position via the zoom lens drive control unit 102. In addition, the control unit 117 drives the focus lens 107 via the focus lens drive control unit 108 based on image information processed by the imaging unit 109, the image signal processing unit 110, and the video signal processing unit 111, to perform focus adjustment.

Figure 2:
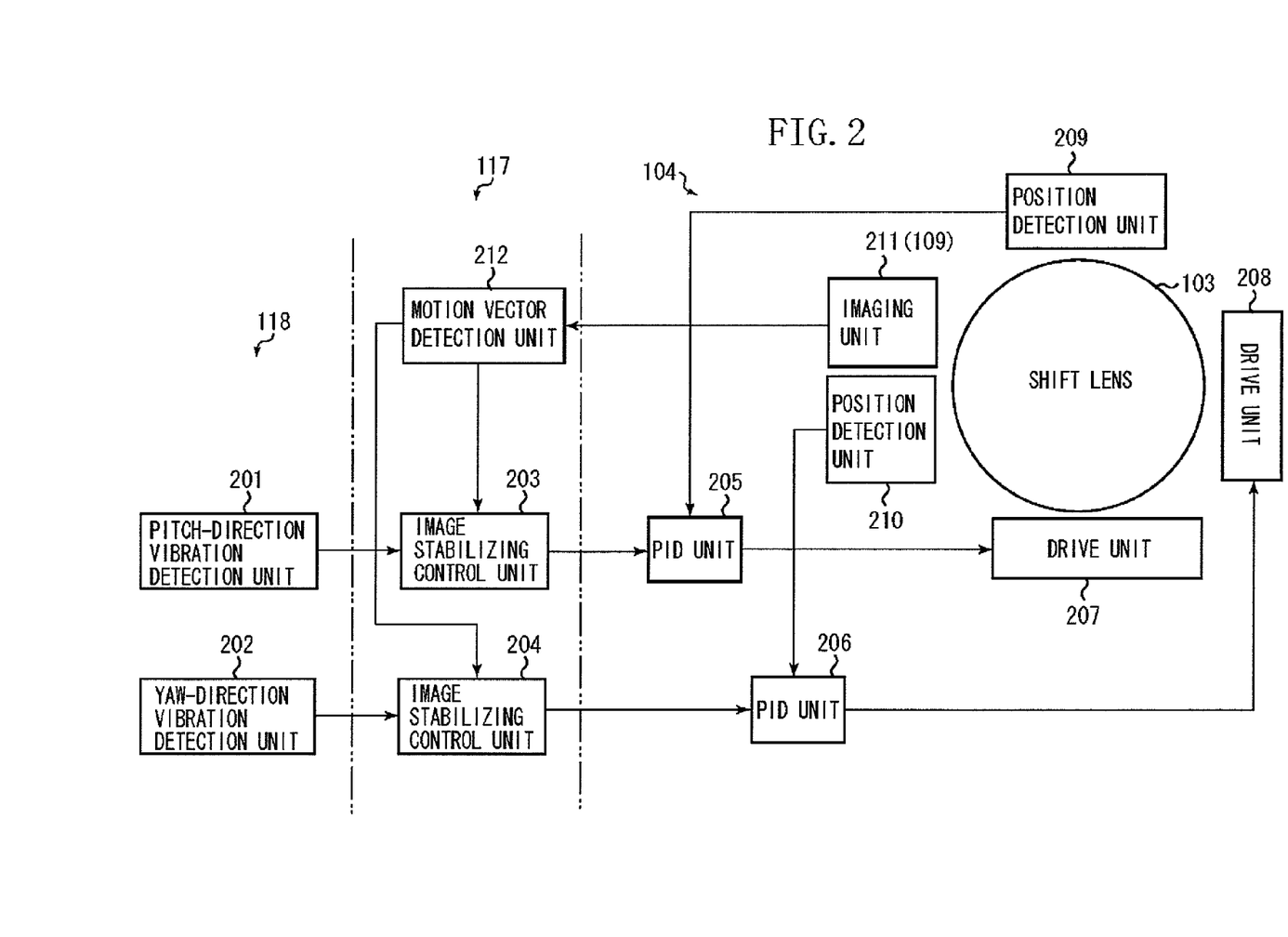
FIG. 2 is a block diagram illustrating a shift lens drive control unit according to each exemplary embodiment of the present invention.

FIG. 2 is a block diagram illustrating the shift lens drive control unit 104 illustrated in FIG. 1.

In FIG. 2, a pitch-direction vibration detection unit 201 detects a vibration applied to the imaging apparatus in a pitch-direction (vertical direction) when the imaging apparatus is in a normal position, and a yaw-direction vibration detection unit 202 detects a vibration applied to the imaging apparatus in a yaw-direction (horizontal direction) when the imaging apparatus is in a normal position.

Image stabilizing control units 203 and 204 generate an correction position control signal for instructing a drive target position of the shift lens 103 based on a motion vector detected by a motion vector detection unit 212 using an image signal output from an imaging unit 211 and a vibration output signal from the vibration detection units 201 and 202. The imaging unit 211 corresponds to the imaging unit 109 in FIG. 1.

Proportional-integral-derivative (PID) units 205 and 206 control to drive so that differences between a correction position control signal and a shift lens position signal in each of the pitch-direction and the yaw-direction become zero. Drive units 207 and 208 drive the shift lens 103 based a signal from the PID units 205 and 206. A position detection unit 209 detects a position of the shift lens 103 in the pitch-direction and outputs a shift lens position signal, and a position detection unit 210 detects a position of the shift lens 103 in the yaw-direction and outputs a shift lens position signal.

The image stabilizing control units 203 and 204 and the motion vector detection unit 212 are included in the control unit 117 in FIG. 1, and the PID units 205 and 206, the drive units 207 and 208, and the position detection units 209 and 210 are included in the shift lens drive control unit 104 in FIG. 1.

Next, an image vibration correction (image stabilizing) operation will be described.

The image vibration correction operation is performed by an operation in which the image stabilizing control units 203 and 204 and the shift lens drive control unit 104 drive the shift lens 103 based on the vibration output signal from the vibration detection units 201 and 202 and the vibration output signal (motion vector) from the motion vector detection unit 212. Specifically, the image stabilizing control units 203 and 204 calculate the correction position control signal (drive target value=vibration correction amount) based on the each vibration output signal. The shift lens drive control unit 104 drives the shift lens 103 based on the correction position control signal and the shift lens position signal to perform the image vibration correction operation.

This position control of the shift lens 103 is performed when the shift lens 103 is driven. More specifically, the position detection units 209 and 210 (Hall elements) each detect a magnetic flux of a magnet attached to the shift lens 103, so that the position control of the shift lens 103 is performed. And a feedback position control is performed so that an output of the Hall element, which indicates a position of the shift lens 103, corresponds to the vibration correction amount output from the image stabilizing control units 203 and 204.

Since the outputs of the Hall elements of the position detection units 209 and 210 have variations, the outputs of the Hall elements need to be adjusted so that the shift lens 103 is moved to a predetermined position corresponding to a predetermined vibration amount. At this time, the PID units 205 and 206 perform a PID control using a proportional control (P control), an integral control (I control), and a derivative control (D control). A PID control signal is output to the drive units 207 and 208.

Figure 3:
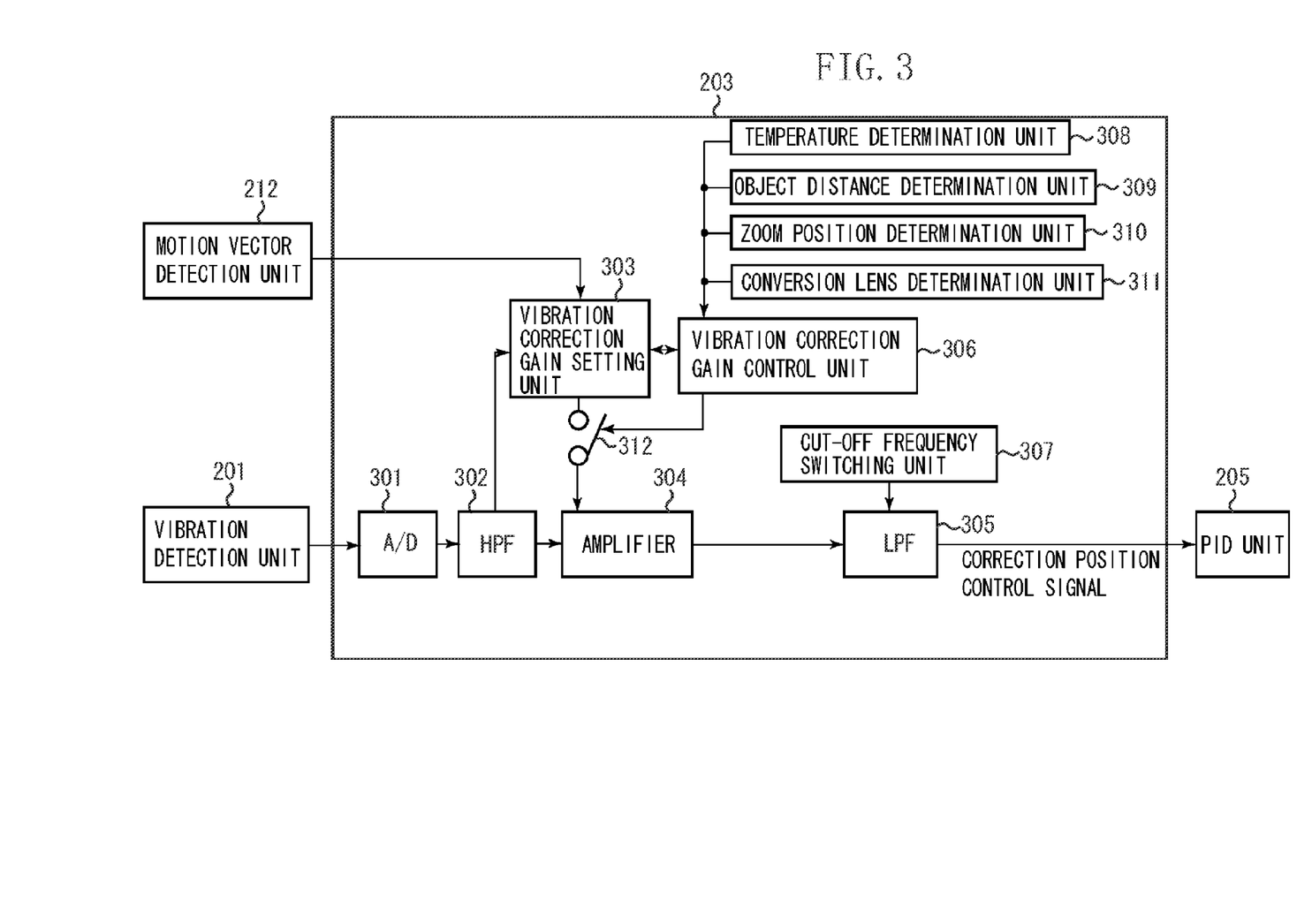
FIG. 3 is a block diagram illustrating an image stabilizing control unit according to each exemplary embodiment of the present invention.

FIG. 3 is a block diagram illustrating an image stabilizing control unit 203 illustrated in FIG. 2, and illustrating an example in which an angular velocity sensor is used as a vibration sensor 201. An image stabilizing control unit 204 has a configuration similar to that of the image stabilizing control unit 203, therefore the details are not described.

In FIG. 3, an analog/digital (A/D) converter 301 converts an angular velocity signal output from the vibration detection unit 201 into a digital signal. A high pass filter (HPF) 302 cuts a direct current (DC) component. The cut-off frequency of the HPF can be changed. A vibration correction gain setting unit 303 calculates a gain adjustment value coefficient based on the angular velocity signal and the motion vector, and sets an appropriate vibration correction gain.

An amplifier 304 outputs a vibration amount gain-controlled by a vibration correction gain input from the HPF 302 via a switch. A low pass filter (LPF) 305 converts the angular velocity signal (a vibration amount) into an angular signal and outputs the angular signal as the correction position control signal.

A cut-off frequency switching unit 307 changes the cut-off frequency of the LPF 305 according to the vibration amount. By changing the cut-off frequency of the LPF 305 according to the vibration amount, the shift lens 103 can be moved to the vicinity of the center according to the vibration amount applied to the imaging apparatus. Therefore, even after a large shake such as a panning operation is applied, a natural image can be obtained.

A vibration correction gain control unit 306 receives signals indicating that an imaging condition has changed from a temperature determination unit 308, an object distance determination unit 309, a zoom position determination unit 310, and a conversion lens determination unit 311. The temperature determination unit 308 has a thermometer (not illustrated) for measuring an ambient temperature around the imaging apparatus, and a temperature storage unit (not illustrated) for storing the measured temperature.

The object distance determination unit 309 measures and stores an object distance in an object distance storage unit (not illustrated). The zoom position determination unit 310 includes a sensor (not illustrated) for detecting a position of the zoom lens 101, and a zoom position storage unit (not illustrated) for storing the position of the zoom lens 101. The conversion lens determination unit 311 includes a sensor (not illustrated) for determining that the conversion lens is attached.

The vibration correction gain control unit 306 sends an instruction for restarting the vibration correction gain setting to the vibration correction gain setting unit 303, and turns on the switch 312. In this way, the amplifier 304 can perform a gain control for the vibration output signal (angular velocity signal) according to the vibration correction gain.

When an appropriate vibration correction gain is set by the vibration correction gain setting unit 303, and the imaging condition is not changed after the gain setting, the vibration correction gain control unit 306 turns off the switch 312. In this way, the gain control by using the vibration correction gain for the amplifier 304 is stopped.

The angular velocity signal input from the vibration detection unit 201 into the image stabilizing control unit 203 is subjected to the series of filter processing, and then the angular velocity signal is output to the PID unit 205 as the correction position control signal as described above.

Next, an operation of the vibration correction gain setting unit 303 when setting the vibration correction gain by using the angular velocity signal output from the vibration detection unit 201 and the motion vector output from the motion vector detection unit 212 will be described referring to a flowchart illustrated in FIG. 4.

First, in step S101, the vibration correction gain setting unit 303 determines whether an instruction from the vibration correction gain control unit 306 is the vibration correction gain setting. When the instruction is to stop the setting (NO in step S101), the vibration correction gain setting unit 303 ends the operation without setting the vibration correction gain.

On the other hand, when the vibration correction gain setting is instructed (YES in step S101), the process proceeds to step S102. In step S102, the vibration correction gain setting unit 303 acquires the angular velocity signal from the vibration detection unit 201, and the motion vector and a motion vector amount corresponding to the amount of the acquired motion vector from the motion vector detection unit 212, respectively.

In step S103, the gain adjustment value coefficient is calculated by formula (1) below.

$$\text{Gain adjustment value coefficient} = \text{motion vector amount}/\text{angular velocity signal} \quad (1)$$

In step S104, the vibration correction gain setting unit 303 compares the obtained gain adjustment value coefficient with a predetermined value. When it is determined that the calculated gain adjustment value coefficient is larger than a predetermined value (NO in step S104), in other words, when the motion vector is larger, a sufficient image vibration correction effect cannot be obtained.

Therefore, the vibration correction gain setting unit 303 determines that the currently set vibration correction gain is not appropriate (NO in step S104), and the process proceeds to step S106. In step S106, the vibration correction gain setting unit 303 clears a time count for measuring a time period while the vibration correction gain is appropriately set.

In step S108, the vibration correction gain setting unit 303 sets a vibration correction gain based on the gain adjustment value coefficient so that the gain adjustment value coefficient becomes smaller. Then, the process returns to step S102, and the vibration correction gain setting unit 303 repeats the same operation.

In step S104, when the calculated gain adjustment value coefficient becomes smaller than or equal to the predetermined value, in other words, when the motion vector becomes small, the vibration correction gain setting unit 303 determines that the set vibration correction gain is appropriate (YES in step S104), and the process proceeds to step S105.

In step S105, the vibration correction gain setting unit 303 increments a time count for measuring a time period while the vibration correction gain is appropriately set. Next, in step S107, the vibration correction gain setting unit 303 compares the time count with a predetermined time period. When the time count is smaller than the predetermined time period, the vibration correction gain setting unit 303 determines that the time period while the vibration correction gain is appropriately set is small (NO in step S107), and the process returns to step S102.

The case where the time count is smaller than the predetermined time period includes a case where a moving object is imaged or a panning operation is performed. If the gain adjustment value coefficient is calculated based on a detected motion vector in the above case, an appropriate vibration correction gain cannot be obtained. Therefore, the process returns to step S102, and the vibration correction gain setting unit 303 repeats the same operation.

When the vibration correction gain setting unit 303 determines that the time count is larger than or equal to the predetermined time period (YES in step S107), the process proceeds to step S109. Since it is determined, in step 107, that the counted time period while the vibration correction gain is appropriately set is longer than a predetermined time period, the vibration correction gain at this time can be assumed to have been set at an appropriate value.

Accordingly, in step S109, a current temperature is acquired from the temperature determination unit 308 and this temperature is stored. Then, in step S110, the vibration correction gain setting unit 303 completes the vibration correction gain setting.

Figure 5:
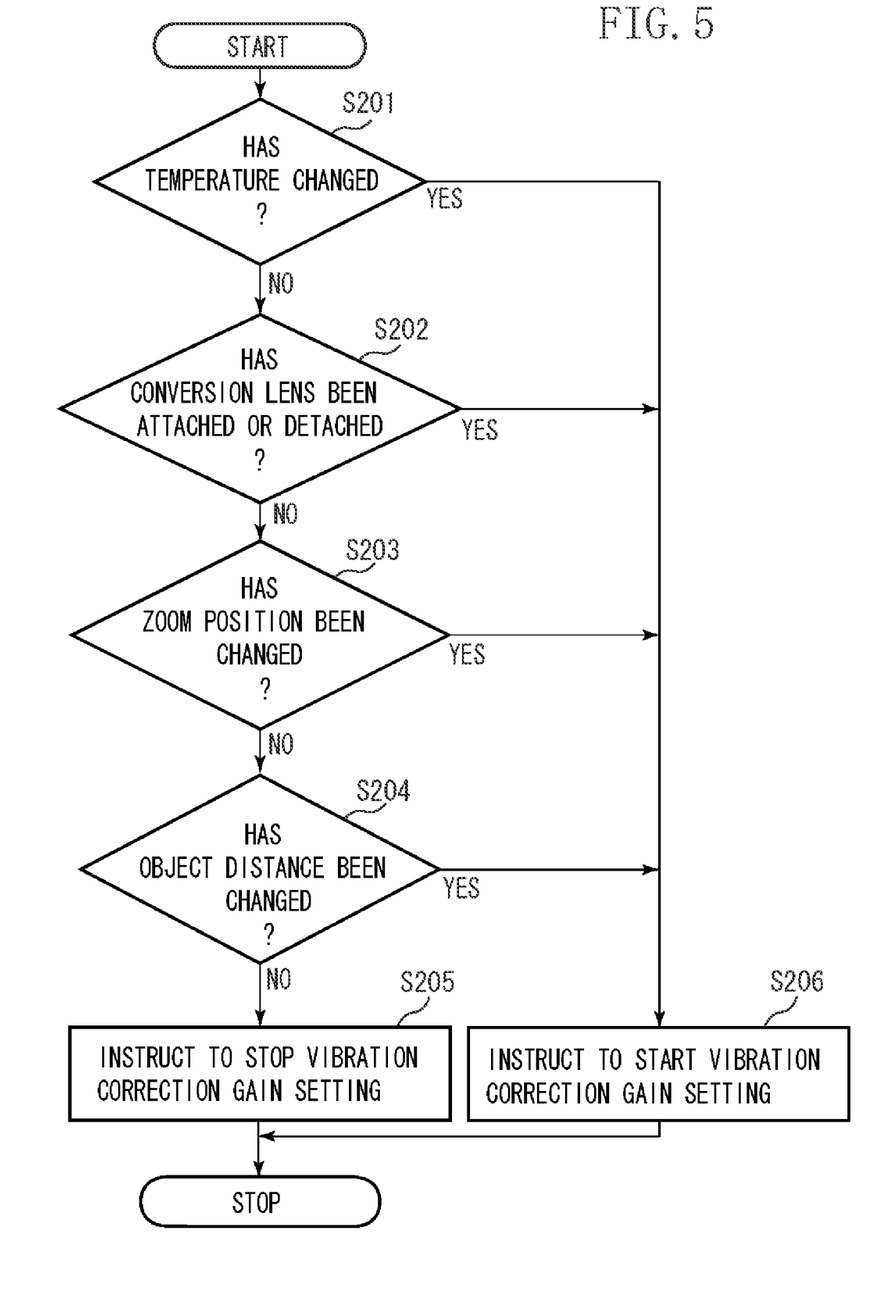
FIG. 5 is a flowchart illustrating an operation in a vibration correction gain control unit for starting and stopping the vibration correction gain setting according to the first exemplary embodiment of the present invention.

Next, an operation in the vibration correction gain control unit 306, more specifically, an operation in which the vibration correction gain setting is started or stopped depending on whether an imaging condition has changed, will be described referring to a flowchart of FIG. 5.

Figure 4:
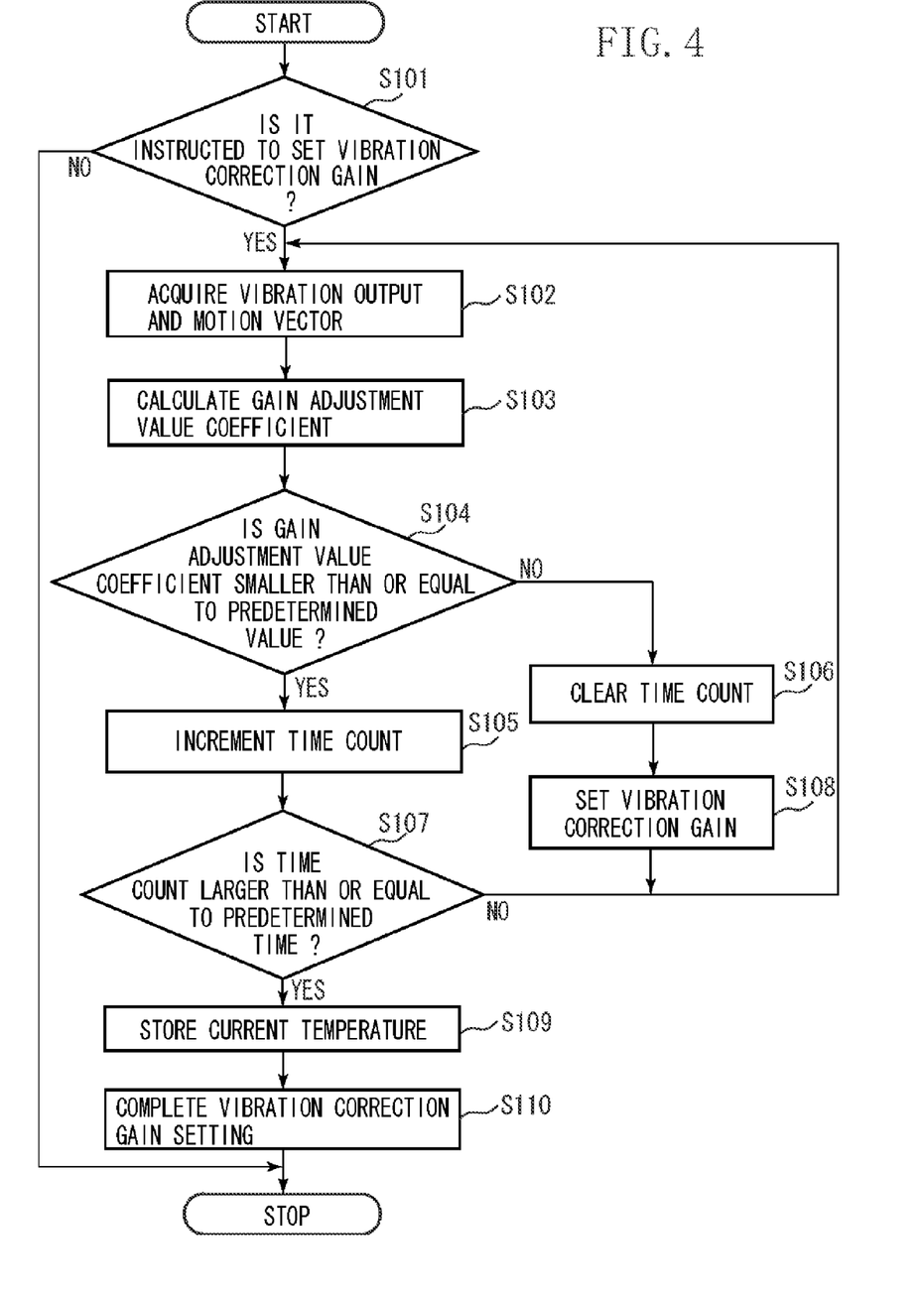
FIG. 4 is a flowchart illustrating a vibration correction gain setting operation according to a first exemplary embodiment of the present invention.

First, in step S201, the vibration correction gain control unit 306 compares the temperature stored in step S109 in FIG. 4 with a current temperature, and determines whether the temperature has changed. This is because an appropriate vibration correction amount needs to be set according to a temperature, as an output of the angular velocity sensor changes according to a temperature change.

As a result, when the vibration correction gain control unit 306 determines that the temperature has changed (YES in step S201), the process proceeds to step S206. In step S206, the vibration correction gain control unit 306 instructs the vibration correction gain setting unit 303 to start the vibration correction gain setting. Then, the vibration correction gain setting unit 303 starts the vibration correction gain setting.

On the other hand, when the vibration correction gain control unit 306 determines that the temperature has not changed (NO in step S201), then the process proceeds to step S202. In step S202, the vibration correction gain control unit 306 determines whether a conversion lens has been attached or detached by using information from the conversion lens determination unit 311.

This is because an appropriate vibration correction amount varies depending on whether the conversion lens is attached, as a lens sensitivity varies depending on whether the conversion lens is attached. When the vibration correction gain control unit 306 determines that the conversion lens has been attached or detached (YES in step S202), then the process proceeds to step S206.

In step S206, the vibration correction gain control unit 306 issues an instruction to start the vibration correction gain setting to the vibration correction gain setting unit 303. Then, the vibration correction gain setting unit 303 starts the vibration correction gain setting. When the vibration correction gain control unit 306 determines that the conversion lens has not been attached or detached (NO in step S202), then the process proceeds to step S203.

In step S203, the vibration correction gain control unit 306 determines whether the zoom position has been changed by using information from the zoom position determination unit 310. This is because an appropriate vibration correction amount varies according to the zoom position, as the lens sensitivity varies depending on the zoom position.

When the vibration correction gain control unit 306 determines that the zoom position has changed (YES in step S203), then the process proceeds to step S206. In step S206, the vibration correction gain control unit 306 issues an instruction for starting the vibration correction gain setting to the vibration correction gain setting unit 303. Then, the vibration correction gain setting unit 303 starts the vibration correction gain setting. When the vibration correction gain control unit 306 determines that the zoom position has not been changed (NO in step S203), then the process proceeds to step S204.

In step S204, the vibration correction gain control unit 306 determines whether the object distance has been changed by using information from the object distance determination unit 309. This is because an appropriate vibration correction amount varies according to the object distance, as the lens sensitivity varies depending on the object distance.

When the vibration correction gain control unit 306 determines that the object distance has been changed (YES in step S204), then the process proceeds to step S206. In step S206, the vibration correction gain control unit 306 issues an instruction for starting the vibration correction gain setting to the vibration correction gain setting unit 303. Then, the vibration correction gain setting unit 303 starts the vibration correction gain setting.

When the vibration correction gain control unit 306 determines that the object distance has not been changed (NO in step S204), then the process proceeds to step S205. In step S205, the vibration correction gain control unit 306 issues an instruction for stopping the vibration correction gain setting to the vibration correction gain setting unit 303. Then, the vibration correction gain setting unit 303 ends the vibration correction gain setting.

Figure 6:
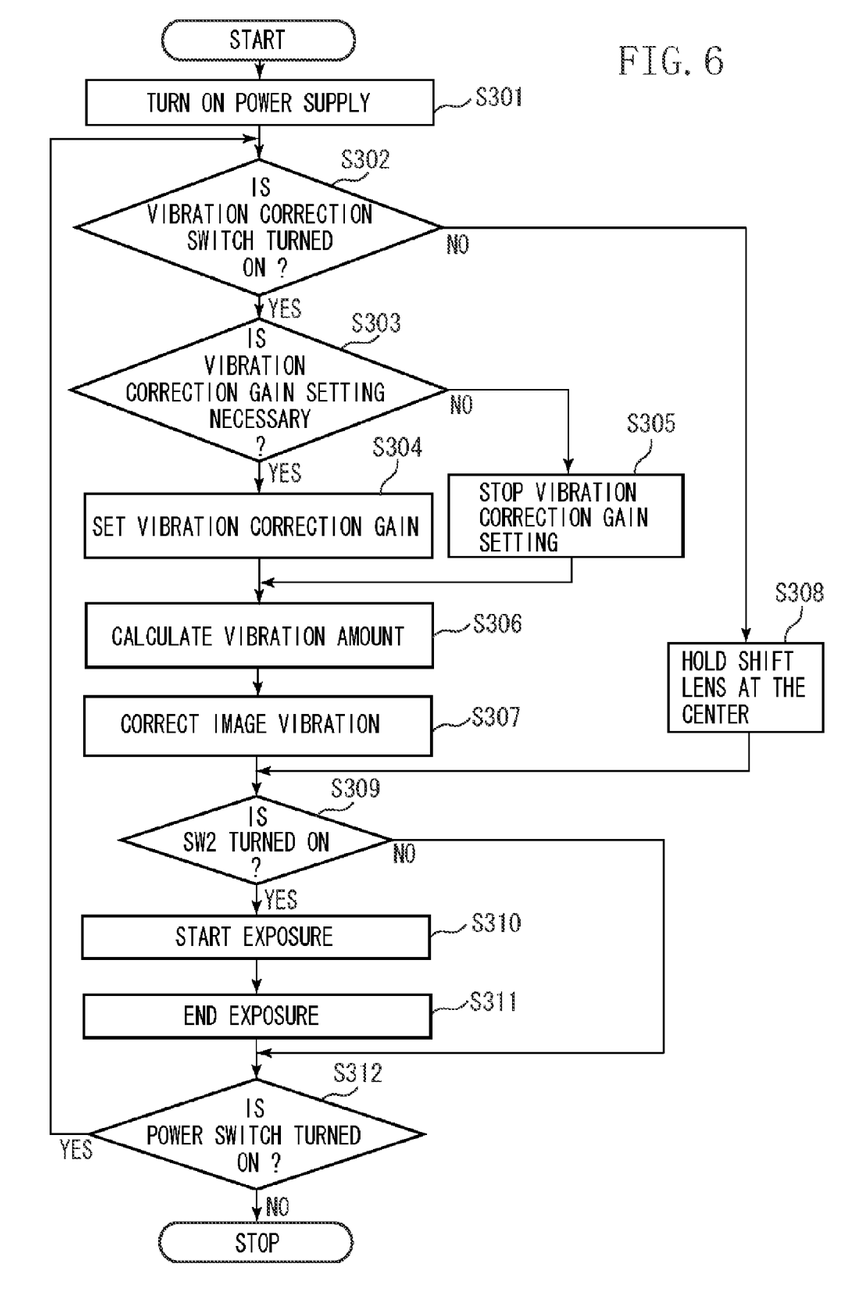
FIG. 6 is a flowchart illustrating operations including an image vibration correction operation according to the first exemplary embodiment of the present invention.

Next, an image vibration correction operation and the like of the imaging apparatus configured as mentioned above will be described referring to a flowchart illustrated in FIG. 6.

In step S301, when a power supply to the imaging apparatus is turned on, the control unit 117 starts the image vibration correction operation. Here, the image vibration correction operation is performed by an interrupt processing generated at a constant frequency (for example, every 250 μsec).

A control in a first direction, for example, in a pitch-direction, and a control in a second direction, for example, in a yaw-direction are performed. When these controls are started, in step S302, the control unit 117 determines whether a vibration correction mode is set according to a condition of the vibration correction switch.

When the vibration correction switch is turned off (NO in step S302), then the process proceeds to step S308. In step S308, the control unit 117 does not perform the vibration correction gain setting, and holds the shift lens 103 at the center (a position corresponding to an imaging optical axis) Then, the process proceeds to step S309.

When the vibration correction switch is turned on (YES in step S302), then the process proceeds to step S303. In step S303, the control unit 117 determines whether the vibration correction gain setting is required.

When the vibration correction gain setting is necessary (YES in step S303), in other words, when an imaging condition has changed, then the process proceeds to step S304. In step S304, the control unit 117 sets the vibration correction gain.

When the control unit 117 determines that the vibration correction gain setting is not necessary (NO in step S303), in other words, when the imaging condition has not changed, the process proceeds to step S305. In step S305, the control unit 117 stops the vibration correction gain setting.

Then, the process proceeds to step S306, and the control unit 117 calculates the vibration amount by using the set vibration correction gain. In step S307, the control unit 117 corrects the image vibration by moving the shift lens 103 to a direction that cancels the camera shake according to the correction position control signal obtained from the calculated vibration amount.

Then, in step S309, the control unit 117 determines a condition of the switch 2 (SW2), which is turned on when the shutter release button is completely pressed down. When the switch 2 is not turned on (NO in step S309), the process proceeds to step S312.

On the other hand, when the switch 2 is turned on (YES in step S309), the process proceeds to step S310. In step S310, the control unit 117 starts an exposure to the image sensor 109. After a predetermined time has passed, the process proceeds to step S311, and the control unit 117 ends the exposure.

In the next step S312, the control unit 117 determines whether the power switch is turned on. When the power switch is turned on (YES in step S312), the process returns to step S302, and the control unit 117 repeats the same operation. When the power switch is turned off (NO in step S312), the operation ends.

Next, the imaging apparatus according to a second exemplary embodiment of the present invention will be described. A configuration of the imaging apparatus is similar to that of FIGS. 1 to 3 described in the first exemplary embodiment. Each operation of FIGS. 4 to 6 is also similar to that of the first exemplary embodiment. Therefore, their descriptions are not repeated.

Figure 7:
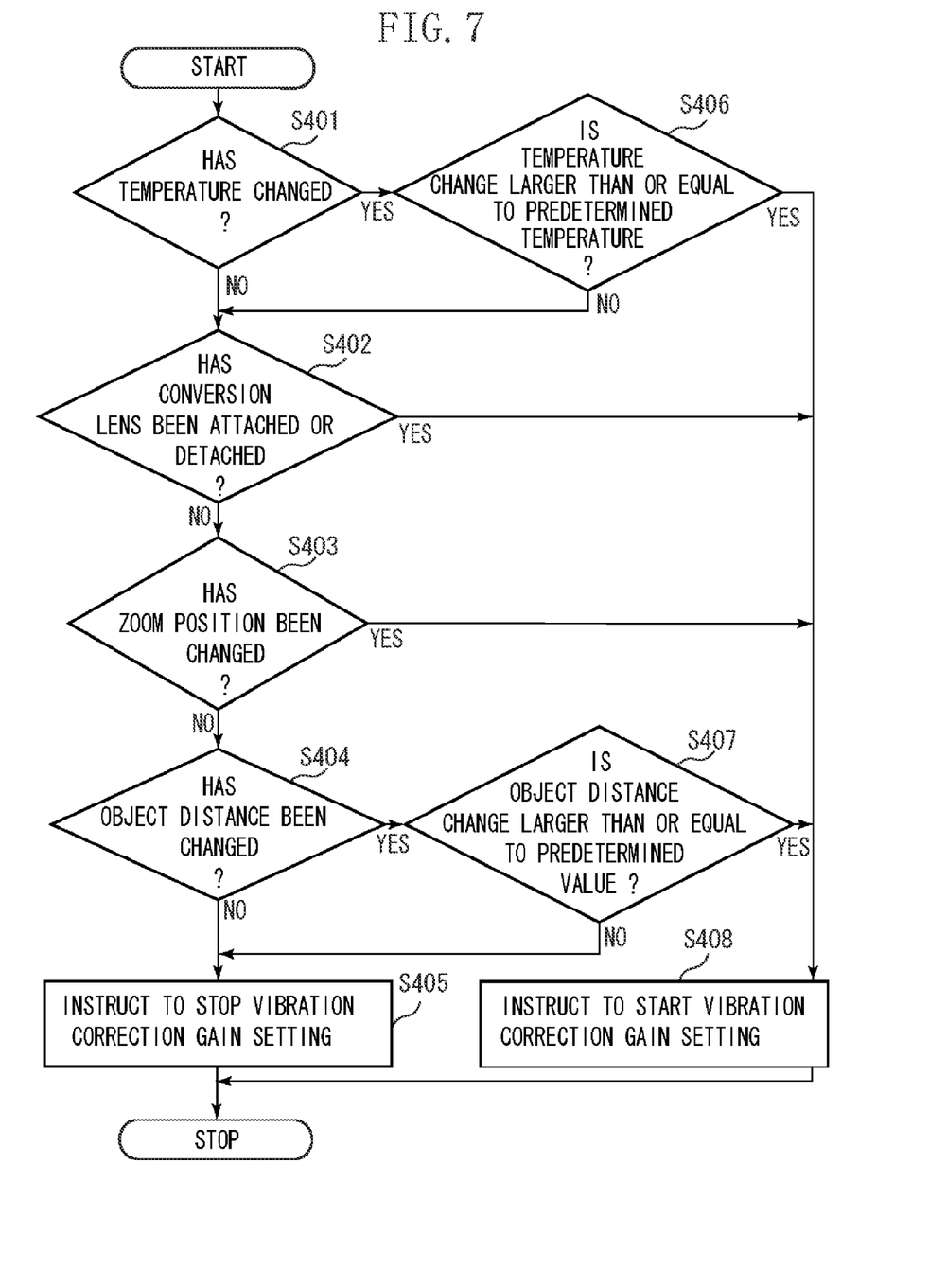
FIG. 7 is a flowchart illustrating an operation for starting and stopping the vibration correction gain setting according to a second exemplary embodiment of the present invention.

FIG. 7 is a flowchart illustrating an operation in the vibration correction gain control unit 306 according to the second exemplary embodiment of the present invention, more specifically, an operation in which the vibration correction gain setting is started or stopped depending on whether an imaging condition has changed. Hereinafter, the imaging apparatus will be described referring to this flowchart.

First, in step S401, the vibration correction gain control unit 306 compares the temperature stored in step S109 of FIG. 4 with a current temperature, and determines whether the temperature has changed. When the comparison result shows that the temperature has not changed (NO in step S401), the process proceeds to step S402.

On the other hand, when the vibration correction gain control unit 306 determines that the temperature has changed (YES in step S401), the process proceeds to step S406. In step S406, the vibration correction gain control unit 306 determines whether the temperature change is equal to or larger than a predetermined temperature range.

When the temperature change is equal to or larger than the predetermined temperature range (YES in step S406), then the process proceeds to step S408. In step S408, the vibration correction gain control unit 306 issues an instruction for starting the vibration correction gain setting to the vibration correction gain setting unit 303. Then, the vibration correction gain setting unit 303 starts the vibration correction gain setting. When the temperature change is smaller than the predetermined temperature change (NO in step S406), then the process proceeds to step S402.

In step S402, the vibration correction gain control unit 306 determines whether the conversion lens has been attached or detached. When the vibration correction gain control unit 306 determines that the conversion lens has been attached or detached (YES in step S402), then the process proceeds to step S408. In step S408, the vibration correction gain control unit 306 issues an instruction for starting the vibration correction gain setting to the vibration correction gain setting unit 303. Then, the vibration correction gain setting unit 303 starts the vibration correction gain setting.

When the vibration correction gain control unit 306 determines that the conversion lens has not been attached or detached (NO in step S402), then the process proceeds to step S403. In step S403, the vibration correction gain control unit 306 determines whether the zoom position has been changed. When the vibration correction gain control unit 306 determines that the zoom position has been changed (YES in step S403), then the process proceeds to step S408. In step S408, the vibration correction gain control unit 306 issues an instruction for starting the vibration correction gain setting to the vibration correction gain setting unit 303. Then, the vibration correction gain setting unit 303 starts the vibration correction gain setting.

In step S403, when the vibration correction gain control unit 306 determines that the zoom position has not been changed (NO in step S403), then the process proceeds to step S404. In step S404, the vibration correction gain control unit 306 determines whether the object distance has been changed. When the vibration correction gain control unit 306 determines that the object distance has not been changed (NO in step S404), the process proceeds to step S405.

When the vibration correction gain control unit 306 determines that the object distance has been changed (YES in step S404), then the process proceeds to step S407. In step S407, the vibration correction gain control unit 306 determines whether the change in the object distance is equal to or larger than a predetermined value (predetermined distance).

When the vibration correction gain control unit 306 determines that the change in the object distance is equal to or larger than the predetermined value (YES in step S407), then the process proceeds to step S408. In step S408, the vibration correction gain control unit 306 issues an instruction for starting the vibration correction gain setting to the vibration correction gain setting unit 303. Then, the vibration correction gain setting unit 303 starts the vibration correction gain setting. On the other hand, when the vibration correction gain control unit 306 determines that the change in object distance is smaller than the predetermined value (NO in step S407), then the process proceeds to step S405.

In step S405, the vibration correction gain control unit 303 issues an instruction for stopping the vibration correction gain setting to the vibration correction gain setting unit 303. Then, the vibration correction gain setting unit 303 stops the vibration correction gain setting.

Next, the imaging apparatus according to a third exemplary embodiment of the present invention will be described. A configuration of the imaging apparatus is similar to that of FIGS. 1 to 3 described in the first exemplary embodiment. Each operation of FIGS. 5 to 6 is also similar to that of the first exemplary embodiment. Therefore, their descriptions are not repeated.

Figure 8:
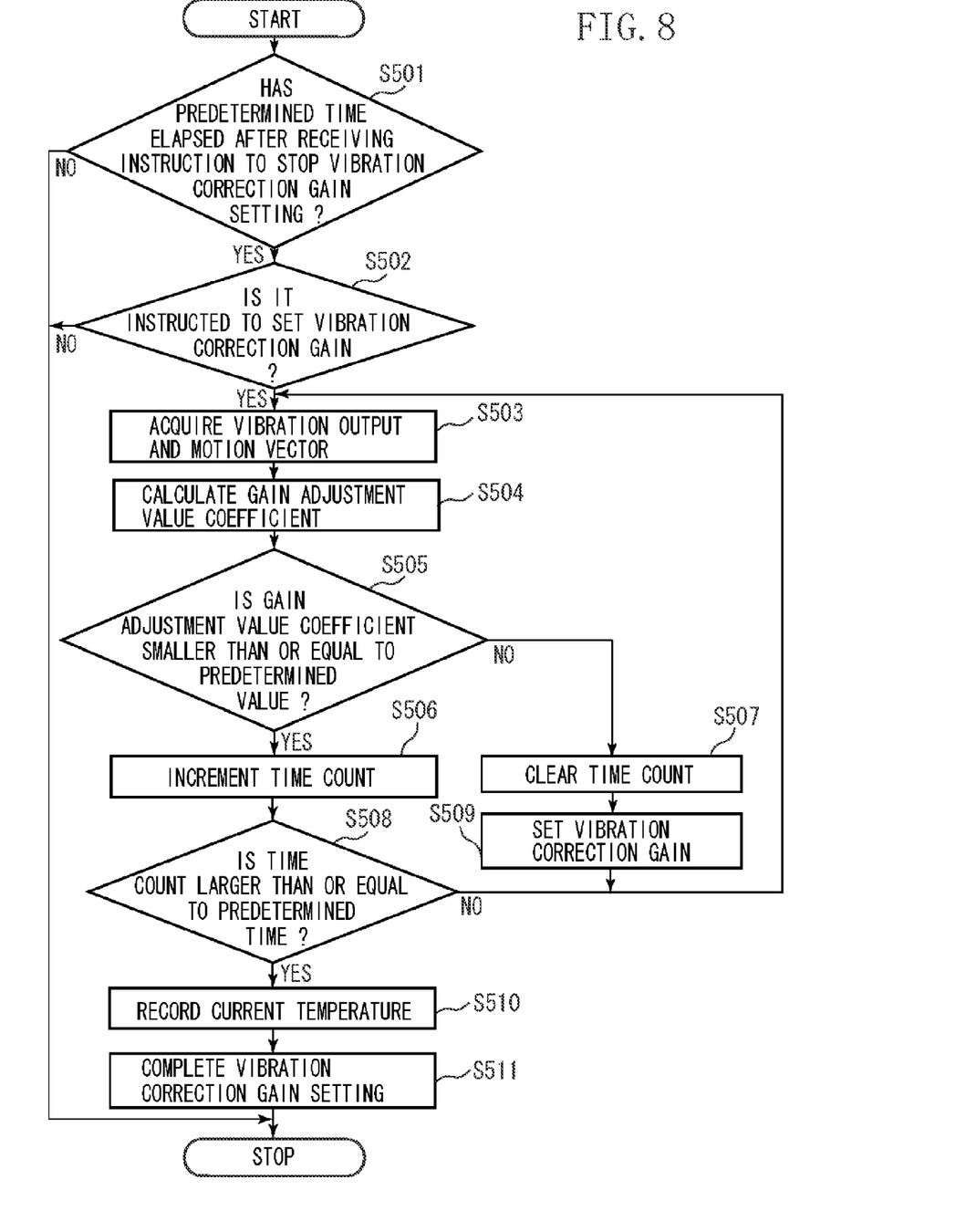
FIG. 8 is a flowchart illustrating the vibration correction gain setting operation according to a third exemplary embodiment of the present invention.

FIG. 8 is a flowchart illustrating an operation according to the third exemplary embodiment of the present invention, in which the vibration correction gain setting unit 303 sets the vibration correction gain based on the angular velocity signal output from the vibration detection unit 201 and the motion vector output from the motion vector detection unit 212. Hereinafter, the operation for setting the vibration correction gain will be described referring to this flowchart.

First, in step S501, the vibration correction gain setting unit 303 determines whether a predetermined time has elapsed after receiving the instruction for stopping the vibration correction gain setting.

As a result, when the vibration correction gain setting unit 303 determines that the specified time has not passed since the instruction for stopping the vibration correction gain setting has been sent (NO in step S501), then the vibration correction gain setting unit 303 ends the operation without performing the vibration correction gain setting. On the other hand, when the vibration correction gain setting unit 303 determines that the specified time has elapsed after the instruction for stopping the vibration correction gain setting is sent (YES in step S501), then the process proceeds to step S502.

In step S502, the vibration correction gain setting unit 303 determines whether the vibration correction gain setting unit 303 is instructed by the vibration correction gain control unit 306 to set the vibration correction gain. When the instruction is to stop the vibration correction gain setting (NO in step S502), then the vibration correction gain setting unit 303 ends the operation without setting the vibration correction gain. On the other hand, when the instruction is to start the vibration correction gain setting (YES in step S502), then the process proceeds to step S503.

In step S503, the vibration correction gain setting unit 303 acquires the output of angular velocity sensor and the motion vector. In step S504, the vibration correction gain setting unit 303 calculates the gain adjustment value coefficient by formula (2) below.

$$\text{Gain adjustment value coefficient} = \text{motion vector/angular velocity signal} \quad (2)$$

In step S505, the vibration correction gain setting unit 303 compares the obtained gain adjustment value coefficient with a predetermined value. When the calculated gain adjustment value coefficient is larger than the predetermined value (NO in step S505), the vibration correction gain setting unit 303 determines that the vibration correction gain is not appropriate, and then the process proceeds to step S507.

In step S507, the vibration correction gain setting unit 303 clears a time count for measuring a time period while the vibration correction gain is appropriately set. In step S509, the vibration correction gain setting unit 303 sets the vibration correction gain based on the gain adjustment value coefficient, and the process returns to step S503.

When the gain adjustment value coefficient calculated in the step S504 is smaller than or equal to the predetermined value (YES in step S505), then the vibration correction gain setting unit 303 determines that the vibration correction gain is appropriate, and the process proceeds to step S506. In step S506, the vibration correction gain setting unit 303 increments the time count for measuring the time period while the vibration correction gain is appropriately set.

Then, the process proceeds to step S508, and the vibration correction gain setting unit 303 compares the time count with a predetermined time. When the time count is smaller than the predetermined time (NO in step S508), then the vibration correction gain setting unit 303 determines that the time period while the vibration correction gain is appropriately set is small, and the process returns to step S503. Then, the vibration correction gain setting unit 303 repeats the same operation.

When the vibration correction gain setting unit 303 determines that the time count is equal to or larger than the predetermined time (YES in step S508), then the process proceeds to step S510.

In step S510, since the time period while the vibration correction gain is appropriately set has been continued, the vibration correction gain set at this time may be appropriate. Therefore, the vibration correction gain setting unit 303 stores the temperature at that time. Then, the process proceeds to step S511, and the vibration correction gain setting unit 303 completes the vibration correction gain setting.

The imaging apparatuses according to the first to third exemplary embodiments include the vibration detection units 201 and 202 for detecting a vibration, and the motion vector detection unit 212 for detecting a motion vector obtained from an image signal taken by the image sensor 109.

In addition, the imaging apparatus includes the image stabilizing control units 203 and 204 for calculating the vibration correction amount for collecting a vibration based on the vibration output signal, and the vibration correction gain setting unit 303 for setting the vibration correction gain for adjusting a gain for the vibration output signal used to calculate the vibration correction amount by using the vibration output signal and the motion vector.

Furthermore, the imaging apparatus includes the shift lens drive control unit 104 for driving the shift lens 103 by using the vibration correction amount (correction position control signal) to correct the image vibration due to a camera vibration, and the vibration correction gain control unit 306 for controlling the vibration correction gain setting.

More specifically, a gain correction coefficient is calculated using the vibration output signal and the motion vector, and the vibration correction gain is set based on the gain correction coefficient. When the gain correction coefficient becomes smaller than or equal to a predetermined value and a predetermined time has elapsed after starting the vibration correction gain setting, the vibration correction gain setting operation is stopped.

When the temperature changes between before and during the use of the imaging apparatus, more specifically, when the temperature change between before and during the use of the imaging apparatus is more than or equal to a predetermined value, the vibration correction gain setting operation is started.

When a lens (conversion lens) for changing a focal length is attached or detached, the vibration correction gain setting operation is started. When the focal length changes (the object distance changes more than or equal to a predetermined value), the vibration correction gain setting operation is started.

When a predetermined time has elapsed after stopping the vibration correction gain setting, the vibration correction gain setting operation is started.

Therefore, an appropriate vibration correction gain can always be set. In addition, the calculation load is reduced by less frequently starting the vibration correction gain setting, so that the power consumption is desirably restrained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-153401 filed Jun. 11, 2008, which is hereby incorporated by reference herein in its entirety.

What is claimed is:

1. An imaging apparatus including an image sensor and a correction optical member movable in a direction perpendicular to an optical axis, the imaging apparatus comprising:
    a vibration detection unit configured to detect a vibration of the imaging apparatus;
    a motion vector detection unit configured to detect a motion vector based on an image signal output from the image sensor;
    an amplifier unit configured to amplify the output from the vibration detection unit;
    a setting unit configured to set a gain of the amplifier unit based on the motion vector;
    an imaging condition detection unit, which includes a temperature sensor, configured to detect a change of an imaging condition wherein the imaging condition detection unit detects the change of the imaging condition when a temperature measured by the temperature sensor changes between a temperature before use and a temperature during use of the imaging apparatus and when a difference between the temperature before use and the temperature during use is greater than or equal to a predetermined temperature;
    a counter configured to increase a time count;
    a gain control unit configured to stop the setting unit from setting the gain of the amplifier unit when a gain adjustment value coefficient is less than or equal to a predetermined value and when the time count is greater than or equal to a predetermined time after starting the gain control,
    wherein the gain control unit starts the gain control when the imaging condition detection unit detects the change of the imaging condition, and clears the time count when the gain adjustment value coefficient is larger than a predetermined value; and
    a vibration correction unit configured to drive the correction optical member to correct an image vibration according to an output from the vibration detection unit,
    wherein the vibration correction unit performs a vibration correction based on the output from the vibration detection unit and the gain of the amplifier unit when the gain control unit does not stop setting of the gain of the amplifier.

2. The imaging apparatus according to claim 1, wherein the setting unit sets the gain of the amplifier unit based on the output from the vibration detection unit and the motion vector.

3. The imaging apparatus according to claim 1, further comprising a vibration correction amount calculation unit configured to output a vibration correction amount for correcting the image vibration based on the output from the vibration detection unit and the gain of the amplifier unit,
    wherein the vibration correction unit drives the correction optical member based on the vibration correction amount output from the vibration correction amount calculation unit, and corrects the image vibration according to the output from the vibration detection unit.

4. The imaging apparatus according to claim 1, wherein the vibration correction unit performs the vibration correction based on only the output from the vibration detection unit when setting the gain of the amplifier unit is stopped by the gain control unit.

5. The imaging apparatus according to claim 1, wherein the imaging condition detection unit also detects the change of the imaging condition when a lens for changing a focal length is attached or detached.

6. The imaging apparatus according to claim 1, wherein the imaging condition detection unit also detects the change of the imaging condition when the focal length is changed.

7. The imaging apparatus according to claim 1, wherein the gain control unit starts setting the gain of the amplifier unit when the distance to the object is changed.

8. The imaging apparatus according to claim 1, wherein the imaging condition detection unit also detects the change of the imaging condition when a predetermined time has elapsed after setting the gain of the amplifier unit is stopped.

9. The imaging apparatus according to claim 1, wherein the imaging condition detection unit also detects the change of the imaging condition when a predetermined time has elapsed after the gain control unit stops the setting unit from setting the gain of the amplifier unit.

10. The imaging apparatus according to claim 1, further comprising:
    a switch unit configured to stop the setting unit from setting the gain of the amplifier unit and to start the gain control,
    wherein the gain control unit switches the switch unit to stop the setting unit from setting the gain of the amplifier unit when a gain adjustment value coefficient is less than or equal to a predetermined value and when the time count is greater than or equal to the predetermined time after starting the gain control, and
    wherein the gain control unit switches the switch unit to start the gain control when the imaging condition detection unit detects the change of the imaging condition.

* * * * *